US007055952B2

(12) United States Patent
Fecteau et al.

(10) Patent No.: US 7,055,952 B2
(45) Date of Patent: Jun. 6, 2006

(54) TEMPLE PIECE FOR EYEWEAR

(75) Inventors: Keith E. Fecteau, Wilbraham, MA (US); Chet Nadkarni, Westboro, MA (US); Glen Stanley, Woodstock, CT (US)

(73) Assignee: Cabot Safety Intermediate Corporation, Newark, DE (US)

( * ) Notice: Subject to any disclaimer, the term of this patent is extended or adjusted under 35 U.S.C. 154(b) by 0 days.

(21) Appl. No.: 10/307,615

(22) Filed: Dec. 2, 2002

(65) Prior Publication Data

US 2004/0105069 A1 Jun. 3, 2004

(51) Int. Cl.
*G02C 5/14* (2006.01)
(52) U.S. Cl. ........................................ 351/122; 351/123
(58) Field of Classification Search .................. 351/41, 351/122, 123, 111, 62
See application file for complete search history.

(56) References Cited

U.S. PATENT DOCUMENTS

| 4,955,706 | A |   | 9/1990 | Schmidthaler et al. ........ 351/41 |
| 5,708,491 | A |   | 1/1998 | Onodera et al. ............ 351/122 |
| 6,059,408 | A | * | 5/2000 | Bonacci ........................ 351/43 |
| 6,565,208 | B1 | * | 5/2003 | Lee ............................. 351/122 |

FOREIGN PATENT DOCUMENTS

| DE | 33 19 826 A1 | 12/1984 |
| DE | 195 47 799 C2 | 8/1997 |
| WO | WO 99/56942 | 11/1999 |

OTHER PUBLICATIONS

International Search Report for International Patent Application PCT/US03/40057.

* cited by examiner

*Primary Examiner*—Hung Xuan Dang
(74) *Attorney, Agent, or Firm*—Cantor Colburn LLP

(57) ABSTRACT

An improved temple piece is provided, including an elongated temple piece, including at least a first and a second region, the at least first and second regions comprising materials having different Shore A durometer hardnesses, wherein the first region has a Shore A durometer hardness less than that of said second region, and wherein the first region extends substantially the length of the temple piece. An elongated temple piece is also provided, including at least a first and a second region, wherein the first region does not predominantly extend, in at least one of the portions where the first region extends along the lower edge of said temple, from the lower edge over an interior surface of the temple piece such that contact between the first region and the side of a wearer's head and the wearer's hair is otherwise reduced.

19 Claims, 2 Drawing Sheets

TEMPLE PIECE FOR EYEWEAR

BACKGROUND

The present disclosure describes an improved temple piece for eyewear. Temples, or "bows", "side pieces", etc., typically mount to an eyeglass frame, or directly to the lens of an eyewear piece. Temples also extend from the eyewear lens or frame rearwardly along the sides of the wearer's head (generally past the temple region of the head and past or around the ears. By extending along the sides of a wearer's head, temples provide a stabilizing member for support of the eyewear as it rests on the nose of a wearer. Temples may also provide additional points of support for the eyewear where such temples apply some pressure inwardly towards the side of the wearer's head and/or where such temples rest on top of the wearer's ears.

SUMMARY

The presently described, improved temple piece for eyewear generally includes dual regions at various positions along the length thereof, the dual regions having different levels of hardness. In one embodiment, a relatively soft region extends substantially along the length of the temple. In such an embodiment, the relatively hard region may extend the entire length of the temple, or it may extend only a portion of the length of the temple.

In another embodiment, the relatively soft region extends substantially along the length of the temple, but terminates within between about one to two inches from the end of the temple piece. In another embodiment, the relatively soft region extends substantially along the length of the temple, but does not run to the end of the attachment portion and does not run to the opposing end of the temple piece.

In another embodiment, the relatively soft region is located such that the relatively soft region would rest on the top of a wearer's ear, but is also positioned such that the relatively soft region does not predominantly contact the side of the wearer's head (and thus, does not grip the wearer's hair, scalp or temple).

In another embodiment, the temple, which includes dual regions at various positions along the length thereof, the dual regions having different levels of hardness, is formed during a dual injection molding process.

The above-discussed and other features and advantages of the improved temple piece for eyewear will be appreciated and understood by those skilled in the art from the following detailed description and drawings.

BRIEF DESCRIPTION OF THE DRAWINGS

Referring now to the drawings, wherein like elements are numbered alike in the several FIGURES.

DETAILED DESCRIPTION OF EXEMPLARY EMBODIMENTS

Reference will now be made in detail to exemplary embodiments, examples of which are illustrated in the accompanying drawings.

Figure 1:
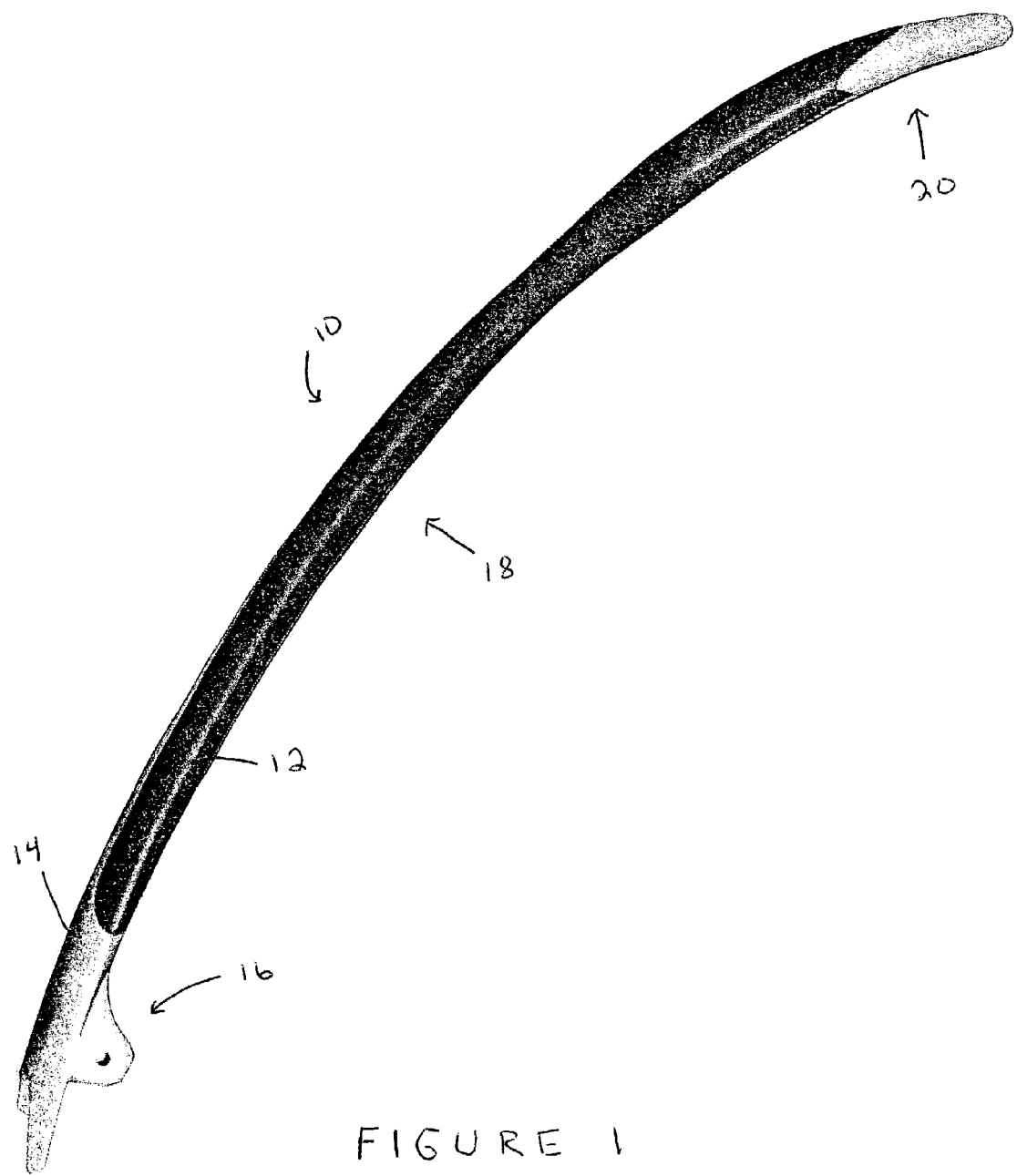
FIG. 1 depicts a bottom view of an exemplary temple in accordance with the present disclosure.
Figure 2:
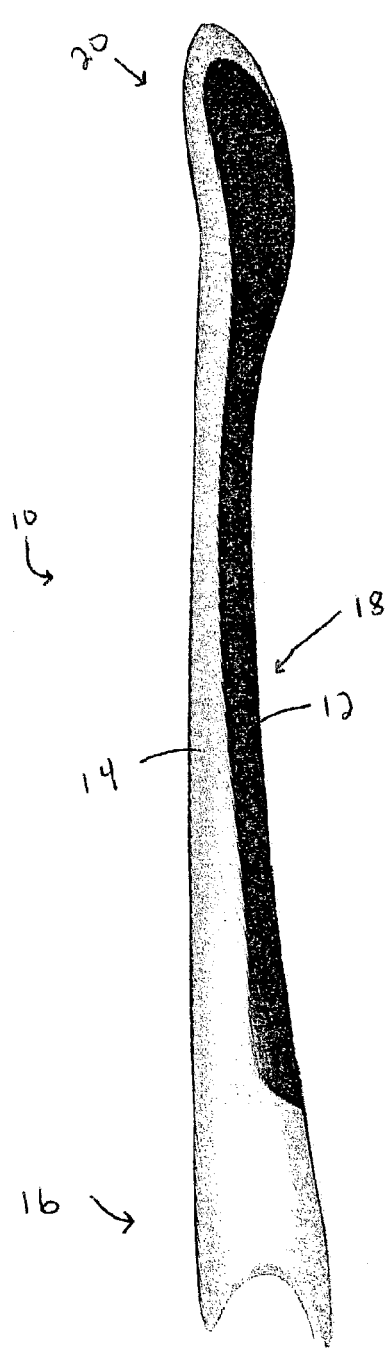
FIG. 2 depicts an exterior side view of the exemplary temple of FIG. 1.
Figure 3:
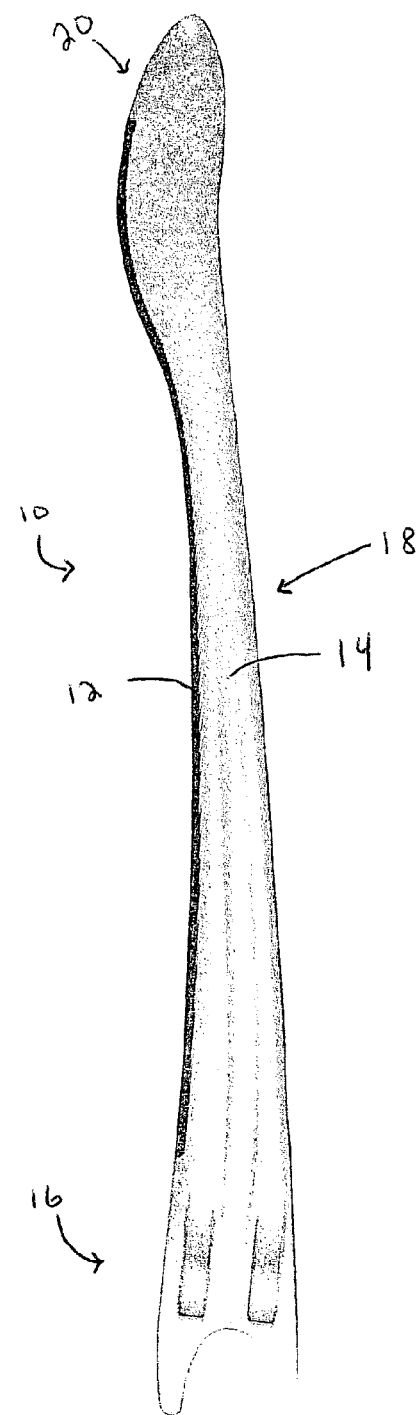
FIG. 3 depicts an interior side view of the exemplary temple of FIG. 1.

The presently described, improved temple piece for eyewear generally includes dual regions at various positions along the length thereof, the dual regions having different levels of hardness. With reference to FIGS. 1–3, an exemplary improved temple piece for eyewear is shown generally at 10. The exemplary temple piece 10 includes, without limitation (i.e., multiple regions may be had, as long as there are at least two exposed regions having differing hardnesses), a first region 12 and a second region 14. As will be described in more detail below, the first region 12 generally has a lower level of hardness (i.e., is softer) than the second region 14.

Referring to the exemplary temple as illustrated by FIG. 1, the temple piece 10 is shown generally with three portions, an attachment portion 16, a side length portion 18, and an end portion 20. In the illustrated embodiment, the first region extends substantially along the length of the exemplary temple. It should be noted that while first region 12 is not illustrated to run the entire lengths of the attachment portion 16 and the end portion 20, the first region 12 may optionally run the full lengths of those portions. Additionally, while the first region 12 is illustrated as running the entire length of the side length portion 18, the first region 12 may optionally run less than the whole length of the side length portion 18 and still run substantially along the length of the exemplary temple. Also, while a particular length is illustrated in the exemplary example, such particular length is not to be limiting. Indeed, the overall length may be somewhat more or less than the length illustrated by the exemplary temple of FIG. 1 and still be equivalent.

Referring now to FIG. 2, a side view of the exemplary temple of FIG. 1 is illustrated. In one embodiment, the illustrated temple is configured to engage the left side of eyewear. In such embodiment, the first region 12 is disposed at least partially on the lower edge of the outside of the temple.

Referring now to FIG. 3, the first region 12 may also extend at least partially around the lower edge of the temple onto the interior surface of the temple (i.e., past the vertical axis of the temple on its lower edge as defined by the temple assembled with eyewear). However, in at least one of the side length portion 18 and end portion 20, the first region 12 does not extend beyond 25 percent of the surface distance from the lower intersection of the vertical axis onto the interior surface to the upper intersection of the vertical axis of the exemplary temple. In another embodiment, in at least one of the side length portion 18 and end portion 20, the first region 12 does not extend beyond 12 percent of the surface distance from the lower intersection of the vertical axis onto the interior surface to the upper intersection of the vertical axis of the exemplary temple. In another exemplary embodiment, in at least one of the side length portion 18 and end portion 20, the first region 12 does not extend beyond 6 percent of the surface distance from the lower intersection of the vertical axis onto the interior surface to the upper intersection of the vertical axis of the exemplary temple. In another exemplary embodiment, in at least one of the side length portion 18 and end portion 20, the first region 12 does not extend beyond the vertical axis onto the interior surface of the exemplary temple.

The above-described embodiments predominantly dispose the harder second region 14 in proximity to the sides of a wearer's head, and dispose in at least one of the side length portion 18 and the end portion 20, the softer material of the first region 12 at least on the lower edge of the temple. Such an arrangement advantageously places the softer region in areas that will grip the ear and optionally a small portion of the head that attaches to the ear. Such an arrangement also excludes the softer regions from areas proximate to the side of the head, thereby preventing the scalp and hair of the wearer from being gripped and/or pulled by the softer, more tacky material of the first region 12, which may be particularly problematic during doffing or donning of the eyewear, or during activities that may tend to cause the eyewear to move back and forth on the wearer's head.

Referring again to FIG. 2, in another exemplary embodiment, the first region 12 may extend from the lower edge of the temple around at least a portion of the exterior surface of the temple, in at least one of the side length portion 18 and end portion 20. In one exemplary embodiment, in at least one of the side length portion 18 and end portion 20, the first region 12 extends up to about 12 percent of the surface distance from the lower intersection of the vertical axis onto the exterior surface to the upper intersection of the vertical axis of the exemplary temple. In another embodiment, in at least one of the side length portion 18 and end portion 20, the first region 12 extends up to about 25 percent of the surface distance from the lower intersection of the vertical axis onto the exterior surface to the upper intersection of the vertical axis of the exemplary temple. In such embodiments, placement of the softer first region 12 at least partially around the exterior surface of the temple provides grip for the temple on both the saddle and the helix of the ear.

In another embodiment, in at least one of the side length portion 18 and end portion 20, the first region 12 extends more than about 60 percent of the surface distance from the lower intersection of the vertical axis onto the exterior surface to the upper intersection of the vertical axis of the exemplary temple. In such embodiment, it may be particularly advantageous to position such first region 12 such that it extends at least from the saddle of the wearer's ear along the exterior of the temple such that it maximizes contact with the helix of the wearer's ear.

In another exemplary embodiment, the temple piece 10 with dual regions 12, 14 having differing levels of hardness (different durometer hardnesses) is made in a single co-injection molding step (rather than being formed separately and thereafter bonded together). Such exemplary co-injection molding may permit substantial savings in processing time and in assembly time. The co-molded regions 12, 14 would remain bonded together either through a chemical bond (through proper selection of the co-molded materials) or through a mechanical bond. Additionally, the co-molded regions 12, 14 may bond through a combination of chemical and mechanical bonds. Alternately, the dual regions 12, 14 may be separately fashioned and subsequently assembled, as is known in the art, e.g., by a mechanical interference fit or with the use of an adhesive.

As discussed above, the first region 12 and the second region 14 comprise materials having differing durometer hardnesses. Such arrangement facilitates strategic placement of these relatively hard and soft materials. Any variation in hardness is contemplated by the present disclosure. However, in one exemplary embodiment, the first region comprises about a 40 to 50 Shore A durometer material, while the second region comprises about an 80 to 90 Shore A durometer material. In another embodiment, additional regions are provided, wherein such additional regions comprise about 40 to 90 Shore A durometer materials.

In another exemplary embodiment, the dual regions 12, 14 are provided having different colors, such that the relative hard and soft regions of the temple may be visually distinguished.

It will be apparent to those skilled in the art that, while exemplary embodiments have been shown and described, various modifications and variations can be made to the improved temple piece disclosed herein without departing from the spirit or scope of the invention. Accordingly, it is to be understood that the various embodiments have been described by way of illustration and not limitation.

What is claimed is:

1. An improved temple piece, comprising:
an elongated temple piece, including at least a coinjected first and second region, the at least first and second regions comprising materials having different Shore A durometer hardnesses, wherein said first region has a Shore A durometer hardness less than that of said second region, wherein said first region extends substantially the length of the temple piece, wherein said first region extends along a lower edge of said temple piece at least along middle or non-attachment end portion of said temple piece, wherein said first region does not predominately extend in at least one temple piece portion from said lower edge over an interior surface of said temple piece and wherein said first region predominately extends in at least one temple piece portion from said lower edge over an exterior surface of said temple piece such that contact between the first region and the helix of a wearer's ear is otherwise increased.

2. The improved temple piece in accordance with claim 1, wherein said first region extends at least 75 percent of the length of the temple piece.

3. The improved temple piece in accordance with claim 1, wherein said first region extends at least 85 percent of the length of the temple piece.

4. The improved temple piece in accordance with claim 1, wherein said first region extends at least 95 percent of the length of the temple piece.

5. The improved temple piece in accordance with claim 1, wherein said first region comprises about a 40 to 50 Shore A durometer material, and wherein said second region comprises about an 80 to 90 Shore A durometer material.

6. The improved temple piece in accordance with claim 1, wherein said first region and said second region comprise materials having different colors.

7. The improved temple in accordance with claim 1, wherein said first region does not extend, in at least one of said portions where said first region extends along said lower edge of said temple, from an assembled vertical axis of said temple piece at said lower edge more than 25 percent over the interior surface of the temple piece.

8. The improved temple in accordance with claim 1, wherein said first region does not extend, in at least one of said portions where said first region extends along said lower edge of said temple, from an assembled vertical axis of said temple piece at said lower edge more than 12 percent over the interior surface of the temple piece.

9. The improved temple in accordance with claim 1, wherein said first region does not extend, in at least one of said portions where said first region extends along said lower edge of said temple, from an assembled vertical axis of said temple piece at said lower edge more than 6 percent over the interior surface of the temple piece.

10. The improved temple in accordance with claim 1, wherein said first region does not extend along any region of the temple piece from an assembled vertical axis of said temple piece at said lower edge more than 25 percent over the interior surface of the temple piece.

11. The improved temple in accordance with claim 1, wherein said first region does not extend along any region of the temple piece from an assembled vertical axis of said temple piece at said lower edge more than 12 percent over the interior surface of the temple piece.

12. The improved temple in accordance with claim 1, wherein said first region does not extend along any region of the temple piece from an assembled vertical axis of said temple piece at said lower edge more than 6 percent over the interior surface of the temple piece.

13. The improved temple in accordance with claim 1, wherein said first region does not extend, in at least one of said portions where said first region extends along a lower edge of said temple, from an assembled vertical axis of said temple piece at said lower edge more than 25 percent over the exterior surface of the temple piece.

14. The improved temple in accordance with claim 1, wherein said first region does not extend, in at least one of said portions where said first region extends along a lower edge of said temple, from an assembled vertical axis of said temple piece at said lower edge more than 12 percent over the exterior surface of the temple piece.

15. The improved temple in accordance with claim 1, wherein said first region extends substantially the length of the temple piece.

16. An improved temple piece, comprising:
an elongaged temple piece, including at least a first and a second region, the at least first and second regions comprising materials having different Shore A durometer hardnesses, wherein said first region has a Shore A durometer hardness less than that of said second region, and wherein said first region extends along a lower edge of said temple piece at least along middle or non-attachment end portion of said temple piece, wherein said first region does not predominately extend in at least one temple piece portion from said lower edge over an interior surface of said temple piece and wherein said first region predominately extends in at least one temple piece portion from said lower edge over an exterior surface of said temple piece such that contact between the first region and the helix of a wearer's ear is otherwise increased.

17. The improved temple in accordance with claim 16, wherein said first region extends, in at least one of said portions where said first region extends along said lower edge of said temple, from an assembled vertical axis of said temple piece at said lower edge more than 60 percent over the exterior surface of the temple piece.

18. The improved temple in accordance with claim 16, wherein said first region extends, in at least one of said portions where said first region extends along said lower edge of said temple, from an assembled vertical axis of said temple piece at said lower edge more than 75 percent over the exterior surface of the temple piece.

19. The improved temple in accordance with claim 16, wherein said first region extends substantially the length of the temple piece.

* * * * *